US009678893B2

(12) United States Patent
Botzum et al.

(10) Patent No.: US 9,678,893 B2
(45) Date of Patent: Jun. 13, 2017

(54) SECURE CACHING TECHNIQUE FOR SHARED DISTRIBUTED CACHES

(75) Inventors: Keys D. Botzum, Columbia, MD (US); Peter D. Birk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 13/464,338

(22) Filed: May 4, 2012

(65) Prior Publication Data

US 2012/0221867 A1 Aug. 30, 2012

Related U.S. Application Data

(63) Continuation of application No. 11/347,860, filed on Feb. 6, 2006, now Pat. No. 8,209,548.

(51) Int. Cl.
*G06F 12/14* (2006.01)
*G06F 21/62* (2013.01)
*G06F 12/084* (2016.01)

(52) U.S. Cl.
CPC .......... *G06F 12/1408* (2013.01); *G06F 21/62* (2013.01); *G06F 21/6209* (2013.01); *G06F 12/084* (2013.01); *G06F 2221/2147* (2013.01)

(58) Field of Classification Search
CPC ... G06F 12/1408; G06F 12/14; G06F 21/6209
USPC .......... 713/189, 192, 193, 194; 380/42, 277
See application file for complete search history.

(56) References Cited

U.S. PATENT DOCUMENTS

| 5,768,390 | A  | * | 6/1998  | Coppersmith et al. ......... 380/42 |
| 7,146,505 | B1 | * | 12/2006 | Harada et al. ................ 713/185 |
| 2003/0026433 | A1 | * | 2/2003  | Matt ............................ 380/278 |
| 2003/0195855 | A1 | * | 10/2003 | Parks et al. .................... 705/51 |
| 2007/0180194 | A1 | * | 8/2007  | Graham et al. ............... 711/133 |
| 2012/0189119 | A1 | * | 7/2012  | Brickell et al. ................. 380/44 |

* cited by examiner

*Primary Examiner* — Farid Homayounmehr
*Assistant Examiner* — Suman Debnath
(74) *Attorney, Agent, or Firm* — Steven M. Greenberg, Esq.; CRGO Law

(57) ABSTRACT

The present invention relates to a secure caching technique for shared distributed caches. A method in accordance with an embodiment of the present invention includes: encrypting a key K to provide a secure key, the key K corresponding to a value to be stored in a cache; and storing the value in the cache using the secure key.

10 Claims, 5 Drawing Sheets

SECURE CACHING TECHNIQUE FOR SHARED DISTRIBUTED CACHES

CROSS-REFERENCE TO RELATED APPLICATIONS

This application is a Continuation of U.S. application Ser. No. 11/347,860, filed Feb. 6, 2006, entitled "SECURE CACHING TECHNIQUE FOR SHARED DISTRIBUTED CACHES," the entirety of which is incorporated herein by reference.

BACKGROUND OF THE INVENTION

1. Field of the Invention

The present invention generally relates to caches, and more specifically relates to a secure caching technique for shared distributed caches.

2. Related Art

Multiple systems in a distributed network commonly maintain a shared distributed cache. This cache maintains key/value pairs. A value is obtained from the cache and stored/updated in the cache using a corresponding key. This is a fairly common technique and is used in many different types of systems. However, this technique can expose a system to a potential security hole. If the key can be guessed, intruders can request and obtain information from the cache for which they are not authorized. This makes the cache unsuitable for maintaining security sensitive data if all parties that have access to the cache cannot be completely trusted.

As an example of this problem, assume that two parties communicate, via a cache, account history information regarding a set of recent transactions in a bank account for a user "Bob." A first party obtains the account history information from a remote system and then caches the account history information for sharing with a second party. A naïve implementation involves storing the account history information in the cache using a key such as "bob.accounthistory." The problem with this approach is that the key is fairly guessable. Any party that reasonably understands the system might easily guess this key and obtain Bob's account history information.

SUMMARY OF THE INVENTION

The present invention relates to a secure caching technique for shared distributed caches. In particular, in accordance with the present invention, the key of a key/value pair is encrypted (e.g., using a mask value and masking algorithm) and stored in the shared distributed cache along with its corresponding value. In order for an intruder to obtain the value, he/she must know both the encryption algorithm and the current encrypted key.

A first aspect of the present invention is directed to a method for secure caching, comprising: encrypting a key K to provide a secure key, the key K corresponding to a value to be stored in a cache; and storing the value in the cache using the secure key.

A second aspect of the present invention is directed to a system for secure caching, comprising: a system for encrypting a key K to provide a secure key, the key K corresponding to a value to be stored in a cache; and a system for storing the value in the cache using the secure key.

A third aspect of the present invention is directed to a program product stored on a tangible medium for secure caching, the tangible medium comprising program code for performing the steps of: encrypting a key K to provide a secure key, the key K corresponding to a value to be stored in a cache; and storing the value in the cache using the secure key.

A fourth aspect of the present invention is directed to a method for deploying an application for providing secure caching, comprising: providing a computer infrastructure being operable to: encrypt a key K to provide a secure key, the key K corresponding to a value to be stored in a cache; and store the value in the cache using the secure key.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

Figure 1:
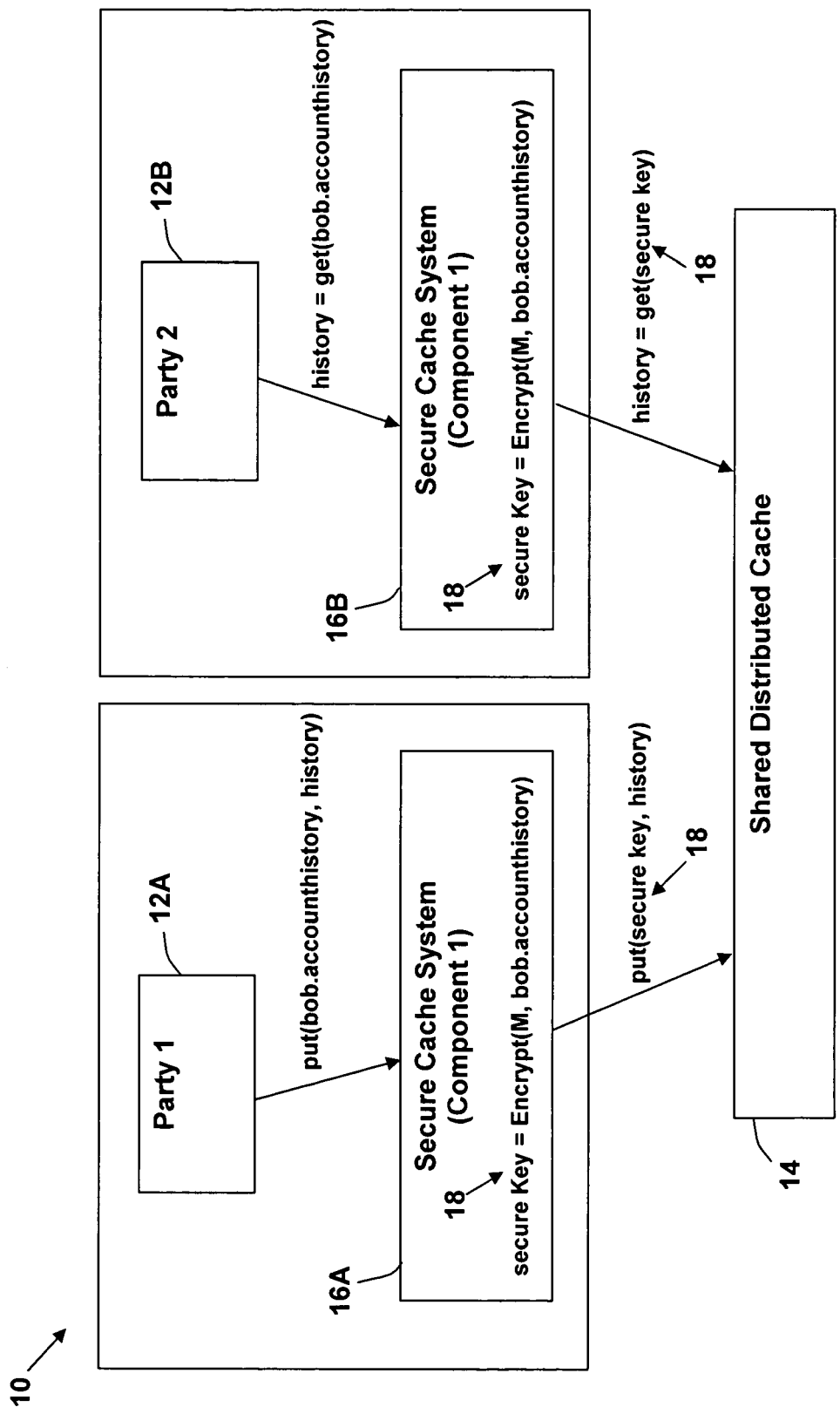
FIG. 1 depicts an illustrative secure cache system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention relates to a secure caching technique for shared distributed caches. In particular, in accordance with the present invention, the key of a key/value pair is encrypted (e.g., using a mask value and masking algorithm) and stored in the shared distributed cache along with its corresponding value. In order for an intruder to obtain the value, he/she must know both the encryption algorithm and the current encrypted key.

Assume as in the above-described example that two parties (computers, servers, etc.) communicate, via a shared distributed cache, account history information regarding a set of recent transactions in a bank account for a user "Bob." A first party obtains the account history information from a remote system and then caches the account history information for sharing with a second party using the key "bob.accounthistory." In accordance with an embodiment of the present invention, the key "bob.accounthistory" can be stored in the shared distributed cache using the secure key Encrypt(M, bob.accounthistory), where M is a mask value. In more general terms, a value can be stored in a shared distributed cache using the secure key Encrypt (M, K), where M is a mask value and K is the key for the key/value pair.

An illustrative secure cache system 10 in accordance with an embodiment of the present invention is depicted in FIG.

1. In the secure cache system 10, a plurality of parties (i.e., a first party 12A and a second party 12B in this example) store and obtain information via shared distributed cache 14. For example, as shown in FIG. 1, the first party 12A initiates the storage of account history information ("history") for the user Bob in the shared distributed cache 14. The account history information ("history") is associated with the key "bob.accounthistory." This is represented in FIG. 1 by the command "put(bob.accounthistory, history)," where "bob.accounthistory" is the key and "history" is the corresponding value in the key/value pair.

The command "put(bob.accounthistory, history)" is received by a secure cache system 16A associated with the first party 12A, which in turn computes a secure key 18. The secure key 18 can be calculated by the secure cache system 16A, for example, by encrypting the key "bob.accounthistory" using a mask value M, resulting in the secure key 18, Encrypt(M, bob.accounthistory). This is done by applying a masking algorithm using the masking value M to obscure the original key "bob.accounthistory," resulting in the secure key 18. Any now known or later developed masking algorithm can be used in the practice of the present invention. Other encryption techniques, such as DES (Data Encryption Standard) and 3DES (Triple DES) can also be used in the practice of the present invention.

Next, the account history information for Bob is stored in the shared distributed cache 14 using the secure key 18. This is represented in FIG. 1 by the command "put(secure key, history)." To this extent, instead of storing the account history information in the shared distributed cache 14 using a key (e.g., bob.accounthistory) that may not be secure, the present invention stores the account history information in the shared distributed cache 14 using a secure key 18 that is unlikely to be compromised.

The second party 12B retrieves the account history information for the user Bob from the shared distributed cache 14 as follows. First, the second party 12B requests the account history information from the shared distributed cache 14 using the key "bob.accounthistory," which is known to both parties 12A,12B. This is represented in FIG. 1 by the command "history=get(bob.accounthistory)." The command "history=get(bob.accounthistory)" is received by a secure cache system 16B associated with the second party 12B, which in turn computes the secure key 18. The secure key 18 is computed by the secure cache system 16B by encrypting the key "bob.accounthistory" using the same mask value M and masking algorithm employed by the secure cache system 16A. This results in the secure key 18, Encrypt(M, bob.accounthistory).

Next, the account history information for Bob is retrieved from the shared distributed cache 14 using the secure key 18. This is represented in FIG. 1 by the command "history=get (secure key)."

Figure 2:
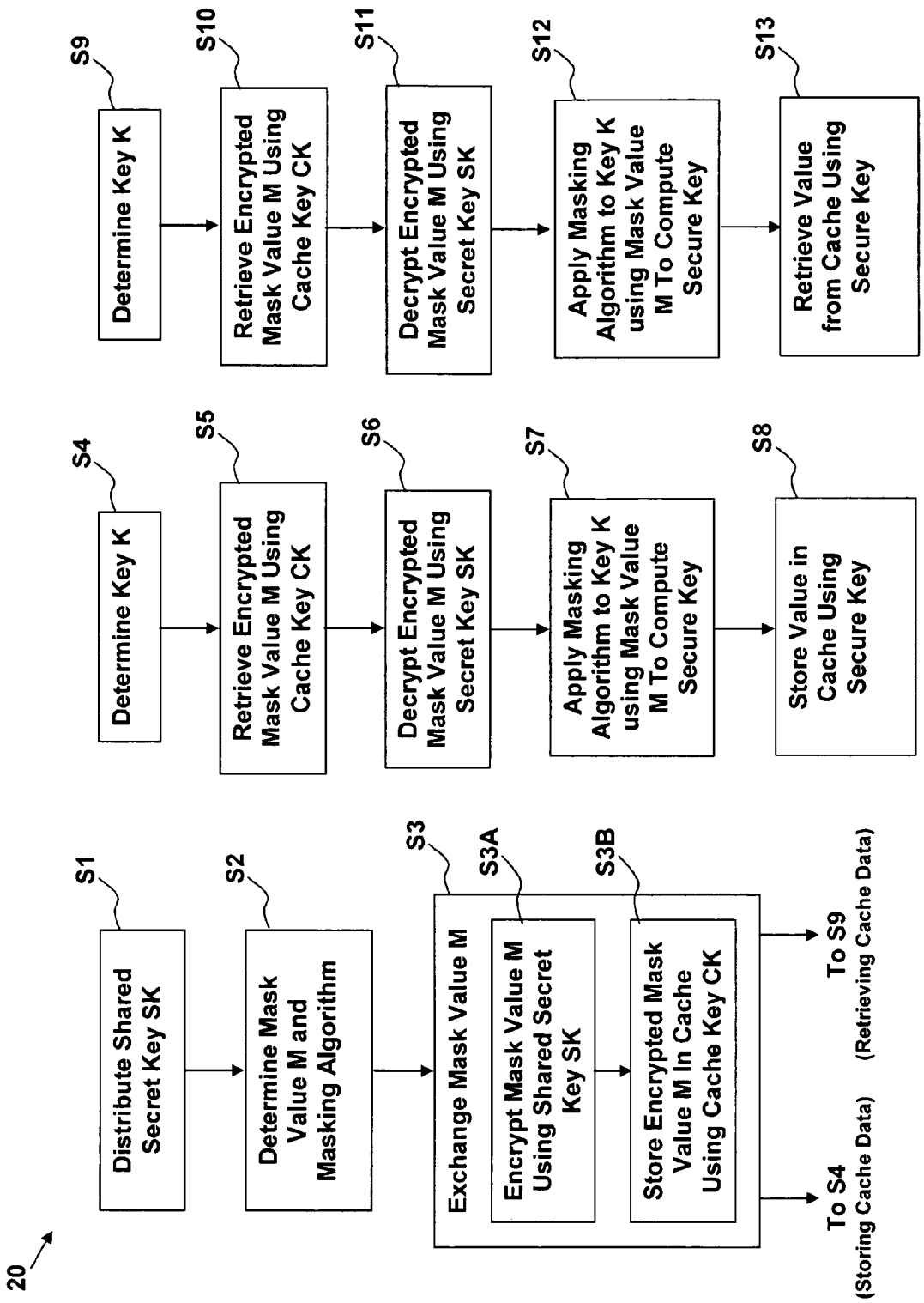
FIG. 2 depicts a flow diagram of an illustrative method in accordance with an embodiment of the present invention.

A flow diagram 20 of an illustrative method in accordance with an embodiment of the present invention is depicted in FIG. 2. In step S1, in advance, a shared secret key SK is distributed via a secure mechanism (e.g., manually) to all parties that will share the distributed cache to store/retrieve commonly accessible data (values) that must be protected. Any suitable methodology for distributing the secret key SK to the parties can be used in the practice of the present invention. In step S2, at initialization, the parties agree on a common randomly generated mask value M and associated masking algorithm. In step S3, the mask value M is exchanged among the parties. This can be done, for example, by encrypting the mask value M using the secret key SK (step S3A) and storing the encrypted mask value M in the shared distributed cache using a cache key CK (step S3B), determined in advance and known to all parties. For example, the cache key CK could comprise "application. mask."

In step S4, when storing a value in the shared distributed cache, a party determines the key K corresponding to the value. In step S5, the encrypted mask value M is retrieved from the shared distributed cache using the cache key CK. In step S6, the encrypted mask value M is decrypted using the secret key SK. In step S7, a masking algorithm is applied to the key K using the mask value M to compute the secure key Encrypt(M, K). In step S8, the value is stored in the shared distributed cache using the secure key Encrypt(M, K).

In step S9, when retrieving a value from the shared distributed cache, a party determines the key K corresponding to the value. In step S10, the encrypted mask value M is retrieved from the shared distributed cache using the cache key CK. In step S11, the encrypted mask value M is decrypted using the secret key SK. In step S12, a masking algorithm is applied to the key K using the mask value M to compute the secure key Encrypt(M, K). In step S13, the party requests and retrieves the value associated with the secure key Encrypt(M, K) from the shared distributed cache.

Figure 4:
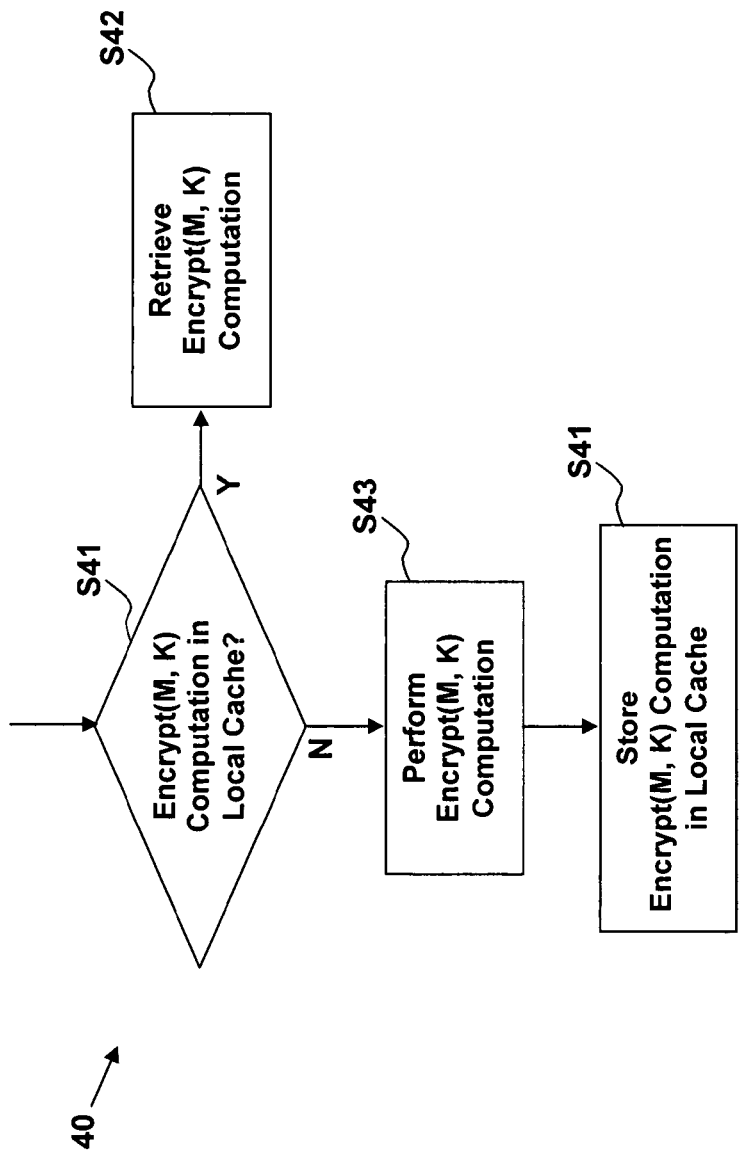
FIG. 4 illustrates a flow diagram of an illustrative local caching process in accordance with an embodiment of the present invention.

To improve the performance of the storage and retrieval processes, the key K to Encrypt(M, K) computations can be cached locally by each party. A flow diagram 40 of an illustrative method for locally caching an Encrypt(M, K) computation is depicted in FIG. 4. In step S41, a party performs a lookup in a local cache to determine if an Encrypt(M, K) computation has already been computed for a given M and K. If yes, then the Encrypt(M, K) computation is retrieved from the local cache in step S42 and used by the party. If not, then the Encrypt(M, K) computation is performed in step S43 for use by the party and stored in the local cache in step S44

It should be noted that no intruder can obtain values from the shared distributed cache without knowing the mask value M. Since the mask value M is regenerated frequently (e.g., at initialization) and the mask value M is distributed only in an encrypted form, this is very unlikely.

Figure 3:
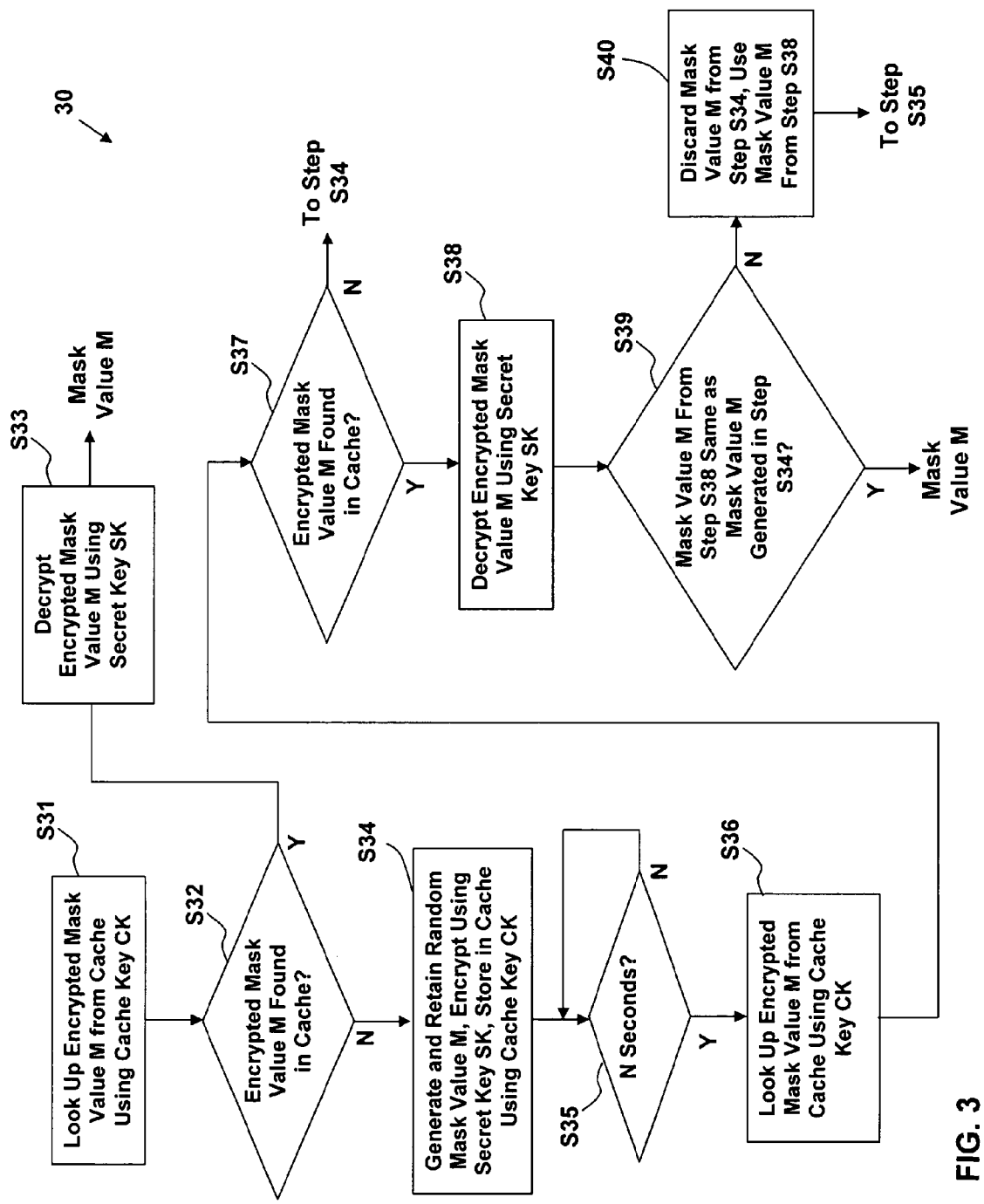
FIG. 3 depicts an illustrative initialization process in accordance with an embodiment of the present invention.

A flow diagram 30 of a illustrative initialization process in accordance with an embodiment of the present invention is depicted in FIG. 3. In step 31, a party looks up the encrypted mask value M from the shared distributed cache using the cache key CK (e.g., "application.mask"). If the encrypted mask value M is found (step S32), then the encrypted mask value M is decrypted in step S33 using the secret key SK to provide the mask value M. If the encrypted mask value M is not found, then flow passes to step S34.

In step S34, a random mask value M is generated and retained, encrypted using the secret key SK, and stored in the shared distributed cache under the cache key CK. For security, the algorithm used to generate the random mask value M should generate highly random values. After waiting N seconds (step S35), where N is the replication time of the shared distributed cache, the encrypted mask value M is looked up in the shared distributed cache using the cache key CK in step S36. If found (step S37), the encrypted mask value M is decrypted in step S38 using the secret key SK and validated (step S39) against the mask value M generated in step S34. If the mask values M are not the same, then the mask value M generated in step S34 is discarded in step S40 and the mask value M provided in step S38 is used. Flow then passes back to step S35. If the mask values M are the same, then the mask value M is used.

In general, the mask value M is regenerated on every system restart. As such, the likelihood of an attacker determining the mask value M if very low. Further, the lifetime of that knowledge being useful is also restricted, because of the limited lifetime of a given mask value M.

The mask value M can also be periodically regenerated in a running system if the system is expected to run for a very long time without a restart. In this case, some type of voting algorithm can be used to determine which party should create the new mask value M. Previous mask values M would need to be kept around for finding old values. In this approach, finding a single value in the shared distributed cache would take up to N mask/lookup attempts, where N is the number of previous mask values M generated since the last system restart.

In accordance with the present invention, the keys that are placed in the shared distributed cache are encrypted to ensure that no unauthorized third party has the knowledge required to generate keys. This approach is taken for several reasons including, for example:
A) The size of the values is unknown, while the keys are expected to be small. Smaller values take less time to encrypt.
B) The values in the shared distributed cache are expected to change more rapidly than the keys. Encrypting the keys will reduce the frequency of encryption/decryption.
C) It is feasible to cache locally the key and its encrypted version to further improve performance when accessing the shared distributed cache.
D) A new cache design is not needed. The present invention adds security to an existing, robust shared distributed cache.

The present invention provides a secure shared distributed cache with the following assumptions:
A) The contents of the shared distributed cache are assumed to not be subject to network snooping. This can be achieved via a variety of well-known techniques, such as encryption of communication at the application level (SSL, DES encryption, etc), network level encryption (IPSEC), or various other forms of network protection, such as firewalls.
B) The shared distributed cache is assumed to be intelligent enough not to replicate the entire cache to unauthorized parties.
C) As with any cryptographic system, the encryption keys are assumed to be protected from intruders.
D) It is assumed that the shared distributed cache does not support a query which will return all of the cache keys.

Figure 5:
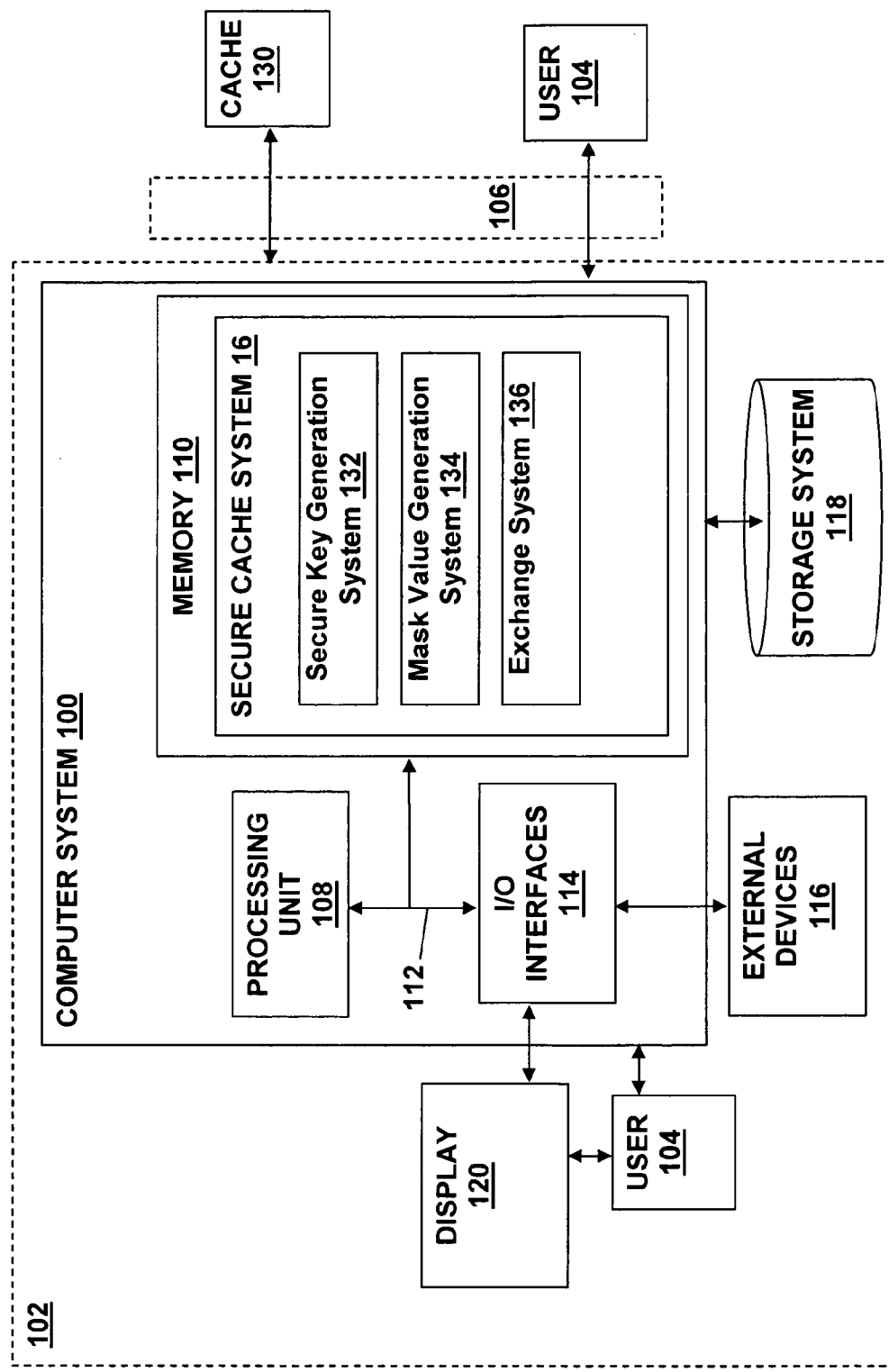
FIG. 5 depicts an illustrative computer system for implementing embodiment(s) of the present invention.

A computer system 100 for providing secure caching in accordance with embodiments of the present invention is depicted in FIG. 5. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides secure caching for a shared distributed cache in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as secure cache system 16, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 5 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a secure cache system 16 for providing secure caching for a shared distributed cache 130 in accordance with embodiments of the present invention. The secure cache system 16 includes a secure key generation system 132 for generating a secure key by applying a masking algorithm to a key K using a mask value M. The secure key is used both to store a value in and retrieve a value from the shared distributed cache 130, as detailed above.

Also provided in the secure cache system 16 is a mask value generation system 134 for generating a mask value M, and an exchange system 136 for exchanging the mask value M with other parties that use the shared distributed cache 130 to store/retrieve commonly accessible data (values) that must be protected. In one embodiment of the present invention, the exchange system 136 is configured to encrypt a mask value M using a secret key SK and store the encrypted mask value M in the shared distributed cache 130, where it can be accessed by other parties using a commonly known cache key CK. The exchange system 136 is also configured to retrieve an encrypted mask value M (e.g., encrypted by another party) from the shared distributed cache 130 using the cache key CK, and to decrypt the encrypted mask value M using the secret key SK.

The present invention can be offered as a business method on a subscription or fee basis. For example, one or more components of the present invention can be created, maintained, supported, and/or deployed by a service provider that offers the functions described herein for customers. That is, a service provider can be used to provide secure caching for a shared distributed cache, as described above.

It should also be understood that the present invention can be realized in hardware, software, or a combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or tangible medium providing program code for use by or in connection with a computer or any instruction execution system. For the purposes of this description, a computer-usable or tangible medium can be any apparatus that can contain, store, communicate, or transport the program for use by or in connection with the instruction execution system, apparatus, or device.

The computer usable storage medium can be an electronic, magnetic, optical, electromagnetic, infrared, or semiconductor system (or apparatus or device). Examples of a tangible (usable storage) medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD). With specific reference to a computer usable storage medium, it is to be understood that a computer usable storage medium excludes transitory media such as transitory signals and other propagation media.

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for secure caching in a shared distributed cache shared by a plurality of parties, comprising:
   initiating a storage of a value in the shared distributed cache by a first party, the value being information to be stored and obtained by the plurality of parties;
   associating a key with the value in a value/key pair;
   generating a mask value and encrypting the mask value using a secret key to provide an encrypted mask value and storing the encrypted mask value in a shared distributed cache using a cache key, wherein the encrypted mask value can be retrieved from the cache using the cache key;
   encrypting the key in the value/key pair by applying a masking algorithm using the generated mask value resulting in the creation of a secure key;
   storing the value in the shared distributed cache using the secure key;
   requesting the value from the shared distributed cache by a second party using the key;
   computing, by the second party, the secure key by encrypting the key using the same mask value and masking algorithm; and
   retrieving, by the second party, the value from the shared distributed cache using the secure key.

2. The method of claim 1, wherein the mask value is obtained by:
   retrieving the encrypted mask value from the shared distributed cache; and
   decrypting the encrypted mask value using a secret key.

3. The method of claim 2, further comprising:
   securely distributing the secret key to the plurality of parties.

4. The method of claim 1, further comprising:
   periodically regenerating the mask value.

5. A system for secure caching in a shared distributed cache shared by a plurality of parties, comprising:
   a first system configured for
   initiating a storage of a value in the shared distributed cache by a first party, the value being information to be stored and obtained by the plurality of parties;
   associating a key with the value in a value/key pair;
   generating a mask value and encrypting the mask value using a secret key to provide an encrypted mask value and storing the encrypted mask value in a shared distributed cache using a cache key, wherein the encrypted mask value can be retrieved from the cache using the cache key;

encrypting the key in the value/key pair by applying a masking algorithm using the mask value resulting in the creation of a secure key; and storing the value in the shared distributed cache using the secure key; and a second system configured for requesting the value from the shared distributed cache by a second party using the key;

computing the secure key by encrypting the key using the same mask value and masking algorithm; and retrieving the value from the shared distributed cache using the secure key.

6. The system of claim 5, wherein the second system is further configured for retrieving the encrypted mask value from the shared distributed cache; and decrypting the encrypted mask value using a secret key.

7. The system of claim 6, wherein the secret key is securely distributed to the plurality of parties.

8. The system of claim 5, wherein the mask value is periodically regenerated.

9. A computer program product for secure caching in a shared distributed cache shared by a plurality of parties, the computer program product comprising:

a computer usable storage medium having computer usable program code embodied therewith, the computer usable program code comprising:

computer usable program code for initiating a storage of a value in the shared distributed cache by a first party, the value being information to be stored and obtained by the plurality of parties;

computer usable program code for associating a key with the value in a value/key pair;

computer usable program code for generating a mask value and encrypting the mask value using a secret key to provide an encrypted mask value and storing the encrypted mask value in a shared distributed cache using a cache key, wherein the encrypted mask value can be retrieved from the cache using the cache key computer usable program code for encrypting the key in the value/key pair by applying a masking algorithm using the mask value resulting in the creation of a secure key;

computer usable program code for storing the value in the shared distributed cache using the secure key;

computer usable program code for requesting the value from the shared distributed cache by a second party using the key;

computer usable program code for computing, by the second party, the secure key by encrypting the key using the same mask value and masking algorithm; and computer usable program code for retrieving, by the second party, the value from the shared distributed cache using the secure key.

10. The computer program product of claim 9, further comprising:

computer usable program code for periodically regenerating the mask value.

* * * * *